United States Patent [19]

Randmere et al.

[11] 3,763,323

[45] Oct. 2, 1973

[54] CURRENT SPLITTING ARRANGEMENT

[75] Inventors: Uno Randmere; Morris A. Suntop, both of Rochester, N.Y.

[73] Assignee: Stromberg-Carlson Corporation, Rochester, N.Y.

[22] Filed: Oct. 12, 1971

[21] Appl. No.: 188,297

[52] U.S. Cl. .......... 179/77, 179/15 BD, 179/15 FD, 321/2, 321/16

[51] Int. Cl. .......... H04j 1/10

[58] Field of Search .......... 179/77, 15 R, 15 BD, 179/15 BF, 15 FD, 1 CN, 2.5 R, 170 D, 170 J, 170 H, 170 T, 170 R; 321/2

[56] References Cited

UNITED STATES PATENTS

| | | | |
|---|---|---|---|
| 3,387,228 | 6/1968 | Randall | 321/2 |
| 3,459,895 | 8/1969 | Ebhardt | 179/2.5 R |
| 3,660,750 | 5/1972 | Businelli | 321/2 |
| 3,624,485 | 11/1971 | Ringelman | 321/2 |
| 2,282,465 | 5/1942 | Edwards | 179/170 D |

*Primary Examiner*—Kathleen H. Claffy
*Assistant Examiner*—Randall P. Myers
*Attorney*—Charles C. Krawczyk

[57] ABSTRACT

A substantially constant direct current (DC) is provided in each branch or spur transmission line connected to a primary transmission line by a current splitter circuit interconnecting the lines. The current splitter circuit includes a DC-to-AC converter-filter circuit for providing a first direct current output, and a direct current path through the inverter for providing a second direct current output. Separate sensor circuits are connected to each of the current splitter outputs to detect faults, such as an open circuit or high resistance, and apply a compensating load to maintain proper operation.

15 Claims, 3 Drawing Figures

UNO RANDMERE
MORRIS A. SUNTOP
INVENTORS

BY Charles C. Krawczyk
Donald M. Winegar
ATTORNEYS

UNO RANDMERE
MORRIS A. SUNTOP
INVENTORS

BY Charles C. Krawczyk
Donald M. Winegar
ATTORNEYS

UNO RANDMERE
MORRIS A. SUNTOP
INVENTORS

BY

ATTORNEYS

CURRENT SPLITTING ARRANGEMENT

BACKGROUND OF THE INVENTION

This invention pertains to current splitting arrangements and, in particular, to means for providing current for branch or spur telephone transmission lines connected to a primary telephone transmission line wherein the magnitude of the current in each branch telephone line is a function of the magnitude of a current in the primary telephone transmission line.

In areas wherein the various telephone subscribers are located a long distance from the telephone exchange, such as in rural areas, a multi-channel frequency division carrier system is generally employed to reduce the number of telephone lines required to connect the various subscribers to the telephone exchange. In a multi-channel frequency division telephone arrangement, frequency divided signals are transmitted from the central office to a subscriber terminal wherein the carrier signals are demodulated and are applied to the individual telephone lines extending to the various subscriber stations. This arrangement provides for a large number of individual single party connections, or a combination of single party connections and multiparty connections, over a single telephone transmission line. A system of this sort is disclosed in a paper entitled "A New Subscriber (Station) Carrier System S-C 861 Carrier" by Peter J. May in the Proceedings of the National Electronics Conference, Volume 33 (1967) on Pages 606 through 611.

It is highly desirable to be able to energize the distant subscriber terminals from a power source that is independent of the local AC power source. The subscriber terminals and repeater circuits include batteries that are used to provide power to develop the necessary ringing and talking current. The telephone exchange transmits, in addition to the carrier signals, a constant line DC current which provides the repeaters, if used, and the subscriber terminals with charging current for the batteries. The DC current is applied to the transmission line by a constant current source at the central office. At the present time, all the repeaters and subscriber terminals are connected in series so that the same amount of current flows through each of the repeaters and the subscriber terminals thereby providing sufficient current for proper operation. This arrangement is sufficient in a case wherein the subscriber terminals are located relatively close to the transmission line. However, there are times in which the subscribers are separated by large distances wherein it is undesirable to connect all the subscriber terminals in series. For example, if subscriber stations are located in opposite directions from an existing transmission line, it is expensive to run the transmission line to a first subscriber terminal serving one group of subscriber stations and the doubling back toward a second subscriber terminal serving a second group of subscriber stations in order to maintain the series circuit relation. If the two subscriber stations were connected in parallel to the transmission line, the current would divide between subscriber terminals in accordance with their resistance, neither of which would have sufficient current for proper operation. Hence, in the prior art, it was required to run a separate transmission line from the central office to one of the separated subscriber terminals, or to have the transmission line double back to maintain the series relationship. It would be highly desirable if an arrangement was provided wherein a number of subscriber terminals can be connected in parallel to, or in combination of series and parallel connections with a common transmission line powered from the central office by a constant current source so that the current flow to the subscriber terminals is equal, or at a preset ratio, to the current flow in the common transmission line.

It is therefore an object of this invention to provide a new and improved current splitter circuit.

It is also an object of this invention to provide a new and improved circuit for receiving current from a constant current source and for providing to a plurality of loads a current that is a function of the magnitude of the received current.

It is still a further object of this invention to provide a new and improved circuit for receiving current from a constant current source and for providing a plurality of current outputs, each having a magnitude substantially equal to that of the received current.

It is also an object of this invention to provide a current splitter circuit that includes means for detecting large increases in the resistance of the load connected thereto and for compensating for the same.

Other objects of this invention will, in part, be obvious and will, in part, appear hereinafter.

BRIEF DESCRIPTION OF THE INVENTION

The current splitter circuit of the invention provides an arrangement wherein the current from a constant current source can be divided into several paths, and wherein the magnitude of the current applied to each path can be equal to that provided by the constant current source, or at some preset ratio.

The current splitter circuit of the invention, for example, provides a means for connecting additional subscriber stations or telephone circuits, via branch or spur transmission lines to a telephone system wherein a plurality of subscriber stations are connected to a central office via a primary transmission line and wherein the subscriber stations are connected in a direct current series circuit with the transmission line to receive direct current power from a constant current source in the central office. The current splitter circuit includes a DC-to-AC converter circuit connected in series with the transmission line for energization thereof. The AC output of the DC-to-AC converter circuit is rectified and applied to a branch transmission line to transmit DC power to the added subscriber station or telephone circuit.

A further feature of the invention includes circuit means for detecting a fault, such as an open circuit or abnormally high resistance in either or both of the series circuit, or branch transmission line, and for applying a compensating load in place to maintain the system in operation.

DESCRIPTION OF THE PREFERRED EMBODIMENT

Figure 1:
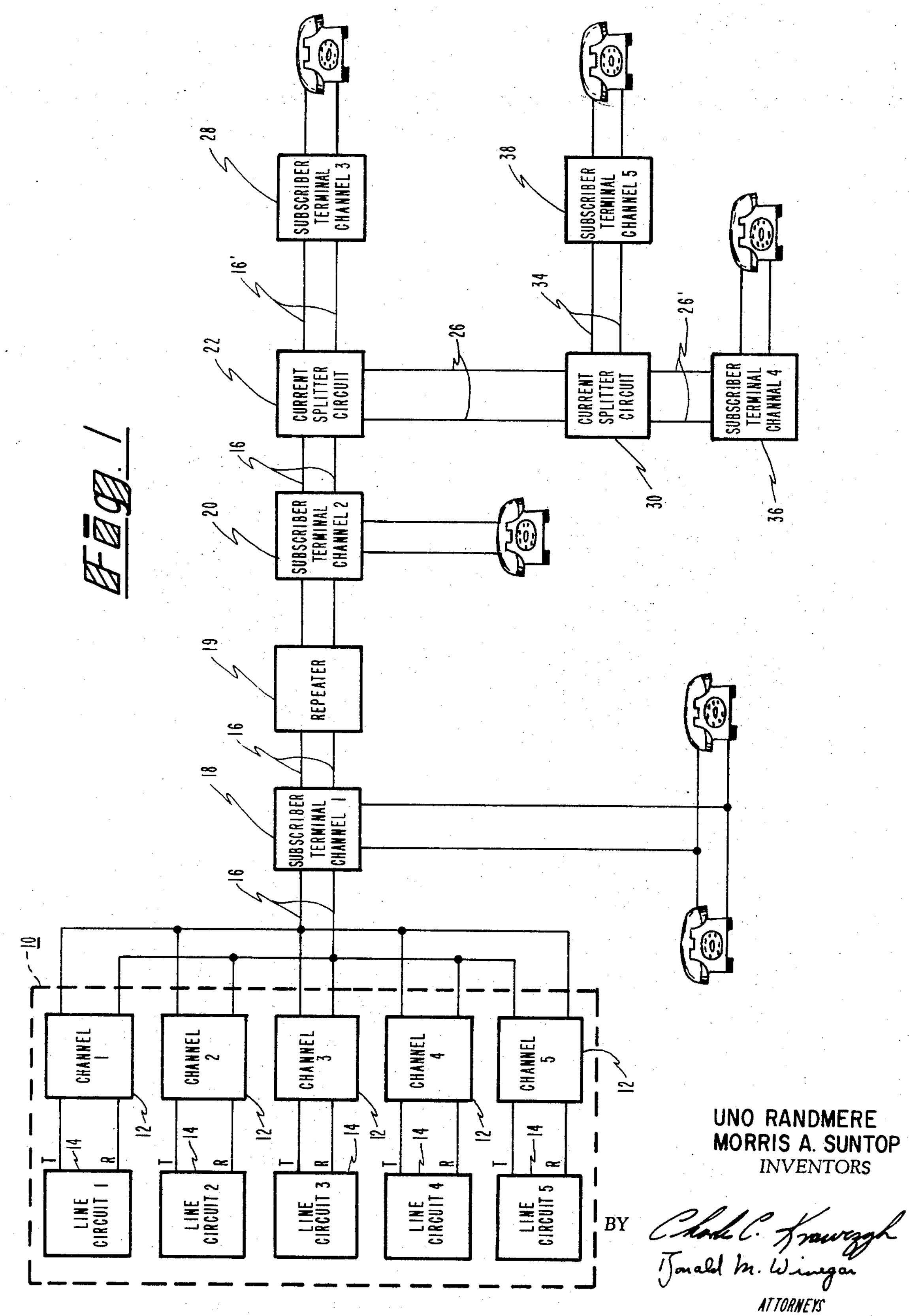
FIG. 1 is a schematic drawing of a multi-channel carrier system embodying line current splitting circuits made in accordance with the teachings of this invention.

The current splitter circuit of the invention is illustrated in FIG. 1 in conjunction with a multi-channel frequency division carrier system. However, it is to be understood that the current splitter circuit of the invention can be used wherever current from a source is to be divided out into two separate outputs, and wherein the current flow in each of the output circuits is at a preset ratio to that of the received current, such as for example, equal thereto. A central office 10 includes five carrier channels 12. Each carrier channel 12 is connected to a separate line circuit 14. The carrier channels receive an audio signal from its connected line circuit and convert it into a carrier modulated signal and apply the modulated signal to a primary two-wire transmission line 16. Each of the channels operates at a different carrier frequency so that a plurality of signals can be transmitted on the same two-wire transmission line 16 without any noticeable signal interference. In addition to the carrier signals, the central office applies a direct current from a constant current source to the transmission line 16. Two subscriber terminals 18 and 20 and a repeater 19 are connected in series directly with the transmission line 16. The subscriber terminals 18 and 20 include a battery for operating the terminal, a demodulator circuit for applying audio signals to the subscriber stations, and a modulator for applying carrier signals to the transmission line 16.

In accordance with the teachings of the invention, a current splitter circuit 22 is also connected in series with the transmission line 16. The current splitter circuit functions to provide two DC outputs, one to the continuation transmission line 16' and another to a branch or spur transmission line 26. The current flow in the transmission line 16' is equal to the current flow in the primary transmission line 16, while the current flow in the branch transmission line 26 can be equal to the current flow in the primary transmission line 16, or at some preset ratio. The current splitter circuit 22 also includes a suitable hybrid arrangement for translating the carrier signals between the transmission line 16 and the transmission lines 16' and 26. The transmission line 16' connects a subscriber terminal 28 to the current splitter circuit 22. A second current splitter circuit 30 is connected in series with the transmission line 22. The second current splitter circuit 30 (like the first current splitter circuit 22), provides two current outputs, one to its continuation transmission line 26', which is equal in magnitude to the amount of current flow received from the branch transmission line 26 and another to a transmission line 34, which is equal to the current in transmission line 26, or at some predetermined ratio to the current flow through the transmission line 26. The current splitter also provides for the transmission of carrier signals between the transmission lines 26, 26' and 34. The continuation transmission line 26' connects a subscriber terminal 36 to the current splitter circuit 30, while the branch transmission line 34 connects a subscriber terminal 38 to the current splitter circuit 30.

As illustrated in FIG. 1, the current splitter circuit of the invention essentially allows parallel or spur connections to the primary transmission line, or any branch thereof, under an arrangement wherein the amount of current flow in the parallel or spur branch transmission lines can be maintained at a preset level, such as for example, equal to that in the primary transmission line. One of the output circuits from the current splitter circuit is in series with the transmission line while the other is a parallel branch. Since a constant current source applies the current to the primary transmission line 16, the current output from the current splitter circuits 22 and 30 will therefore also function of the constant current source.

Figure 2:
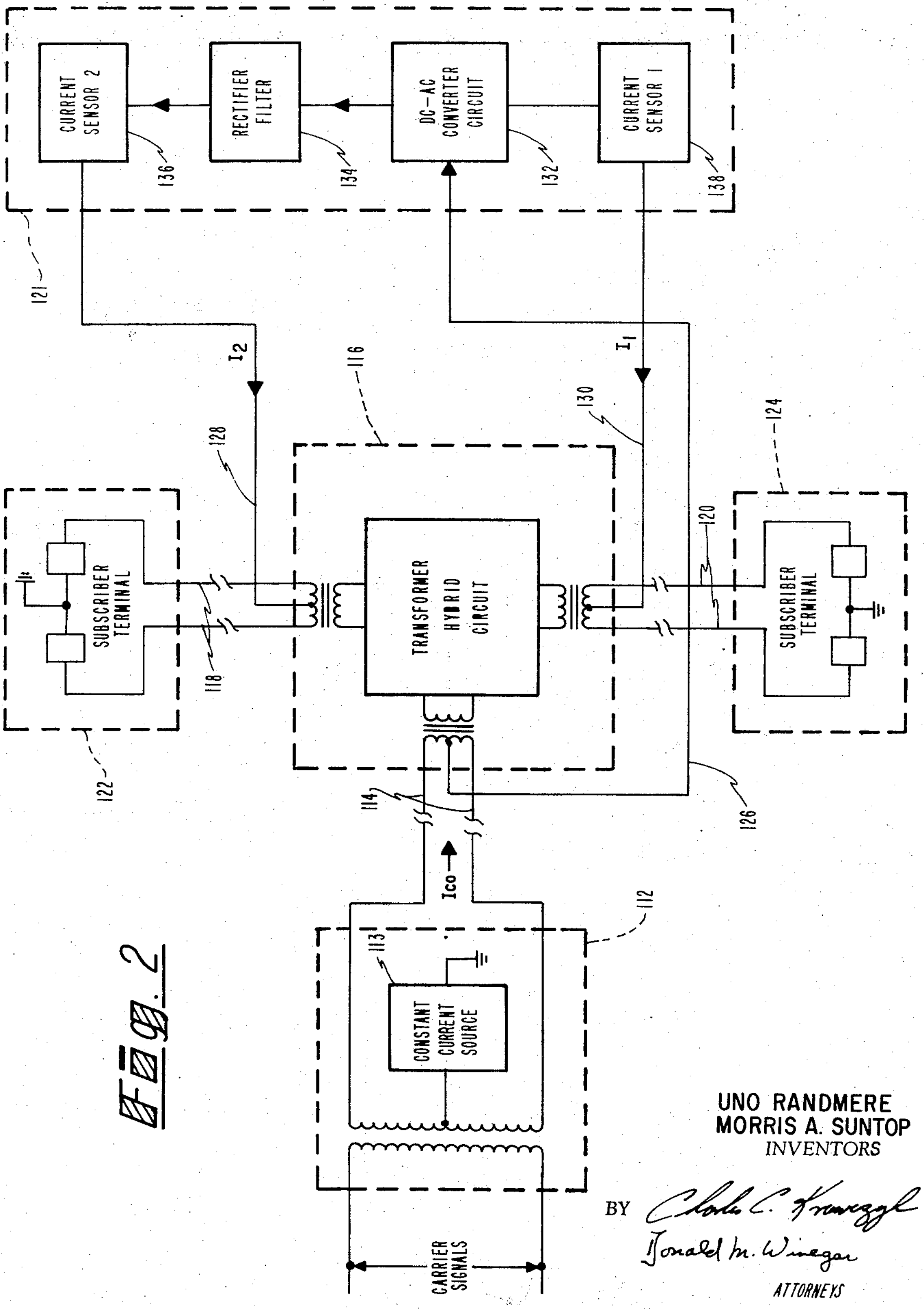
FIG. 2 is an expanded block diagram of a portion of the system of FIG. 1 illustrating the line current splitting circuits of the invention.

Referring now to FIG. 2, there is shown an expanded block diagram of a portion of a transmission line system similar to the transmission line system of FIG. 1. A portion of the system comprises a central office terminal 112 embodying carrier equipment therein which transmits a substantially constant DC current from a constant current source 113 as well as carrier signals via a primary transmission line 114 connected thereto. A transformer hybrid circuit 116 couples the audio and/or carrier signals between the primary transmission line 114 and a first branch transmission line 118 and the primary transmission line continuation 120. The transformer hybrid arrangement 116 is a network which matches the signal transmission of each of the branch transmission lines 118 and the primary transmission line continuation 120 with that of the primary transmission line 114, as well as isolating each of the lines from one another.

The current splitter circuit 121 is connected between the central office 112 and the subterminals 122 and 124 via transmission lines 118 and 120, respectively, and lines 126, 128 and 130. A DC/AC converter circuit 132 is connected between the lead 126 and respective leads 128 and 130. The DC/AC converter 132 has two functions. A first function is to provide a direct DC circuit connection between leads 126 and 130 as a means for providing a DC current (which is of the same magnitude as the DC current in the primary transmission line 114) to the subscriber terminal 124 via a branch transmission line 120. A second function of the DC/AC converter 132 is to provide an AC signal. The AC signal is rectified and filtered in the rectifier-filter circuit 134. The filtered DC current is transmitted via lead 128 and branch transmission line 118 to the subscriber terminal 122.

Connected into each of the respective DC current leads 128 and 130, are current sensor circuits 136 and 138, respectively. The function of each of the current sensor circuits 136 and 138 is to detect a fault condition, such as an open circuit circuit or an abnormally high resistance in its respective transmission lines 128 and 130. When a current sensor circuit 136 or 138 detects a fault, an artificial load is applied to the DC/AC converter 132. The sensor circuits are incorporated into the line current splitting means to maintain the remaining portion of the circuit in operation despite the fault condition.

Figure 3:
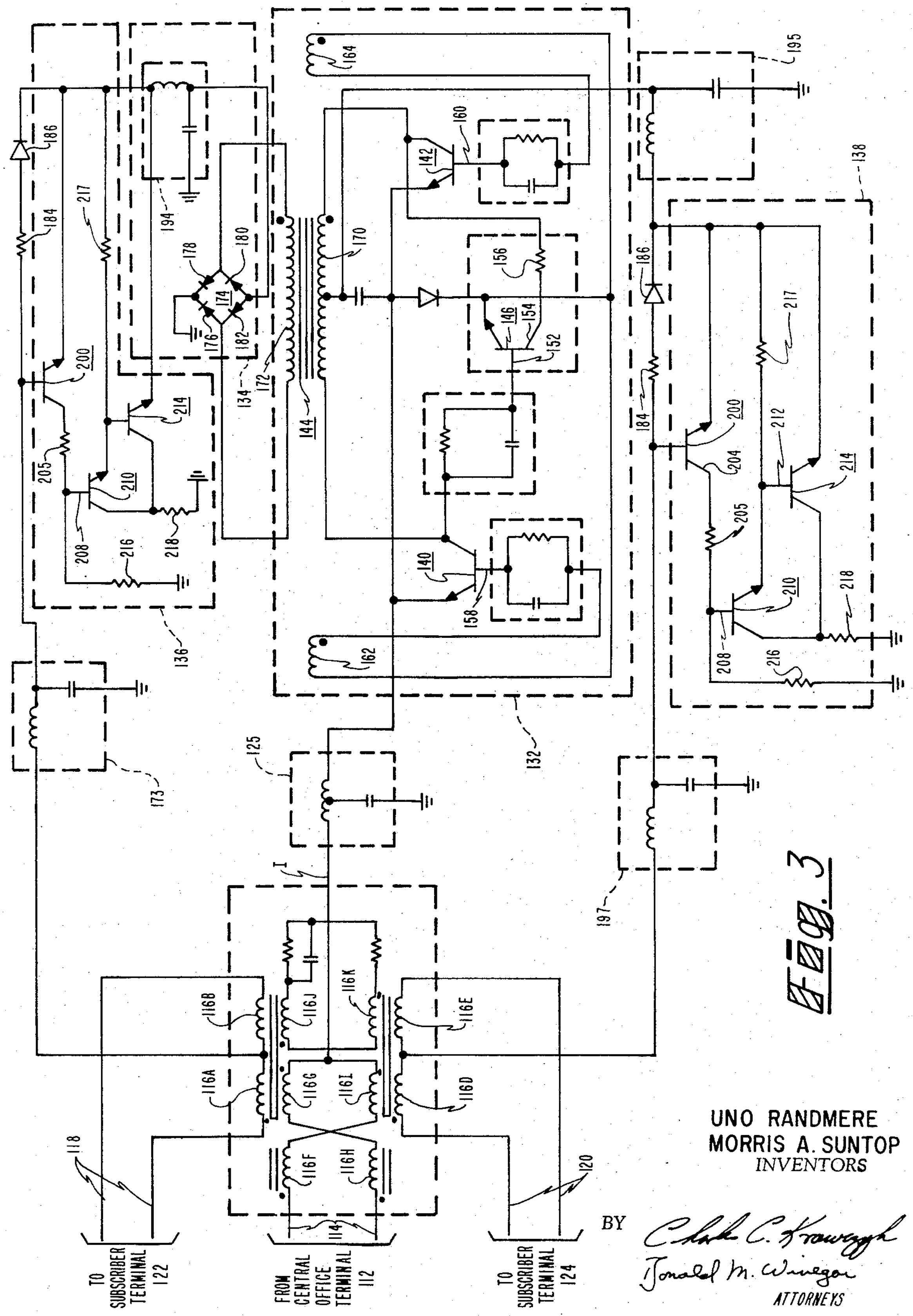
FIG. 3 is a detailed schematic of the line current splitting circuit of the invention.

With reference to FIG. 3, a substantially constant DC current, I, is supplied via the central office terminal 112 by a constant current source 113. The DC current, I, flows through the hybrid circuit windings 116F-116I and a filter circuit 125 to the DC/AC converter 132. Within the DC/AC converter 132, a bistable self-oscillating circuit includes transistors 140 and 142 and a saturating transformer 144. A transistor 146 is connected into the circuit to act as a means to trigger the circuit into its oscillatory mode of operation.

Initially when the DC current is supplied to the DC/AC converter 132, the circuit may not oscillate since no base drive is present. However, at this same instant in time, the transistor 146 senses a positive potential both at its base lead 152 and collector lead 154 and becomes conductive. A current flow is now established in a path via a current limiting resistor 156 and the collector-to-emitter junction of the transistor 146 to the base 158 of transistor 140 and the base 160 of the transistor 142 via the respective feedback windings 162 or 164. Depending on the gain unbalance of the transistors 140 and 142, one or the other transistor becomes conductive. Regeneration sets in and the circuit of the DC/AC converter 132 begins to oscillate. The frequency of oscillation of the circuit of the converter 132 is dependent on the potential across the converter and the designed configuration of the saturation transformer 144.

It is to be noted that once the DC/AC converter 132 has been set into oscillation, either the base 152 or the collector 154 of the transistor 146 will be alternately grounded. Consequently, the transistor 146 will not conduct. Due to the high resistance of resistor 156, little current will flow through the resistor 156, and the resulting losses associated with the resistor 156 is negligible. In essence, the transistor 146 and its associated circuitry are essentially "non-operative" after oscillation of the DC/AC converter 132 is achieved. The overall efficiency of the DC/AC converter 132 is therefore increased. The operation of the DC/AC converter circuit is more fully explained in a copending patent application, Ser. No. 188,266, entitled "DC/AC Converter-Starter Circuit", filed on Oct. 12, 1971 for Morris A. Suntop.

Upon oscillation of the DC/AC circuit, the AC potential appears across the primary winding 170 of the transformer 144 and is transformed to the secondary winding 172. The AC potential is then rectified by a rectifying bridge network 174 connected to the winding 172. The rectifying bridge network 174 comprises diodes 176, 178, 180 and 182. The rectified AC signal is filtered by a filter circuit 194 and the DC current flows through a resistor 184 and a diode 186, a filter circuit 173 and the hybrid windings 116A and 116B to the subscriber terminal 122 via the branch power transmission line 118. The DC current flow in this instance is essentially of the same magnitude as that flowing in the central office terminal 112. It is to be noted, however, that by proper designing of the transformer 144, the magnitude of the DC current flow in the line 118 can also be greater than, or less than, that in the line 114. The continuation transmission line 120 from the subscriber terminal 124 is connected by a direct current path through the DC/AC converter circuit 132 and the sensor circuit 138. The direct current path includes the transistors 140 and 142, the primary winding 170, filter circuit 195, the sensor circuit 138 (diode 186 and resistor 184), the filter 197 and hybrid transformer windings 116D and 116E. Under this arrangement, the current flow in transmission line 120 is equal to that in transmission line 114.

Any variation in the load in the subscriber terminal 122 is reflected back across the primary winding 170 of the transformer 144. This reflection back causes a corresponding change in voltage at the input terminals to the DC/AC converter 132. However, while the variation of loading has caused a voltage change, the current flowing in the circuits has remained essentially constant, both at the input terminals and at the output terminals at approximately 60 milliamperes, which is a normal magnitude for current in a carrier telephone system. Although a load variation has caused a change in potential supplying the subscriber terminal 122 connected to the branch power transmission line 118, no current change occurs in any of the subscriber terminals embodied in the telephone system.

The current sensor circuit 136 is connected to the filter circuit. The DC current passing through the resistor 184 and diode 186 forward biases a transistor 200 to conduct through the resistors 205 and 216. For the normal range of current flow to the transmission line, insufficient potential is available to render the transistors 210 and 214 conductive. Should the subscriber's transmission line 118 open, or an open occurs in the subscriber's equipment, conduction of the transistor 200 ceases and the base 208 of transistor 210 is now forward biased through a resistor 216. The transistors 210 and 214 conduct causing a current to flow through a resistor 218, thereby providing a dummy load across the output of the filter 194. The dummy load provision assures one that no equipment is damaged by any potential generated in the DC/AC converter 132 due to the open circuit and the remainder of the system remains in an operative state. When a load subsequently appears across the terminals of the subscriber terminal 122, the transistor 200 again becomes conductive and the resistor 218, the dummy load, is disconnected.

The function of the sensor circuit 136 is primarily to monitor the circuitry for the occurrence of an open circuit across the lead 118 at the subscriber terminal 122. When the open circuit is sensed, the dummy load is switched into the system. However, a further embodiment of the sensor circuit 136 is to offer protection in instances wherein the resistive load across the lead 118 at the subscriber terminal 122 changes in such a manner as to exceed a preset level. As the resistive load increases above a maximum allowable level for the system, the variation is reflected back across the primary windings of the transformer 144 and may affect the proper operation of the remainder of the system. The value of the resistors 205 and 216 are selected so that when the resistive load across the lead 118 is within the design range, the potential drop across the resistor 205 is insufficient to forward bias the transistors 210 and 214. However, as the resistive load across lead 118 increases above the design limits, the potential drop across the resistor 205 increases to render the transistors 210 and 214 conductive to apply a compensating load. As the resistance of the transmission line circuit increases further, the transistors are rendered further conductive, thereby maintaining the load to the filter circuit 194 relatively constant. In the manner described, the resistor 218, acting as a dummy load, is thereby activated partially or wholly in the sensor circuit 136.

In a similar manner, the sensor circuit 138 is connected to monitor for the occurrence of an open circuit or an excessive resistive load occurrence across the branch transmission line 120, or in the subscriber terminal 124. Since the subscriber terminal 124 is connected in series with the primary transmission line 114 via the current splitting circuit, an open circuit in the subscriber terminal or the transmission line 120 will open circuit the entire transmission line arrangement, causing a complete failure, or the occurrence of excessive resistive load may cause the inefficient operation thereof. The sensor circuit 138 functions, as the sensor circuit 136, to either apply a full dummy load to prevent a system breakdown or to partially apply a dummy load to maintain the operative stability of the system. The sensor circuit 138 is identical to the sensor circuit 136 and therefore the same reference numerals have been used therein. In the case of the sensor circuit 138, under normal conditions, the transistor 200 is biased conductive by the current flow through the resistor 184 and the diode 186, while the transistors 210 and 214 are cut off. In the event of an open circuit, the transistor 200 is rendered non-conductive while the transistors 210 and 214 are rendered conductive to connect the dummy load 118 between the output of the filter 195 and ground. Should the resistance of the transmission line circuit 120 increase above a preset level into an abnormal range, the transistors 210 and 214 are rendered conductive to apply a compensating load to the filter 195, thereby maintaining the overall reistance of the series circuit within desired limits.

The line current splitting means made in accordance with the teachings of this invention allows one to have a primary DC transmission line system with as many parallel or spur branch power lines connected thereto as required and still retain a substantially constant current throughout. A line current splitting means made in accordance with this invention is required at the junction of each parallel or spur branch power transmission line. The DC current in each series continuation of the primary transmission line has the same magnitude as that of the DC current in the initial portion of the primary transmission line. The DC current produced in each of the parallel branch transmission lines may also have substantially the same magnitude of DC current flowing in the line as in the primary transmission line. But by proper design of the saturating transformer 144, the magnitude of the DC current in the branch transmission line may also be less than, or greater than, that in the primary transmission line. Each line current splitting means incorporates a sensor circuit connected to each parallel branch transmission line and each series continuation of the primary transmission line to maintain the system in operation in the event of faults, such as open circuits or abnormally high resistances in the transmission lines.

As an example of the teachings of this invention, a system was constructed wherein the operating circuit DC current, I, was 60 ± 5 milliamperes output for the subscriber terminal 122. The loading capability of the terminal 122 was 1,500 ohms. The open circuit terminal voltage across parallel branch transmission line 118 was 26 ± 1.5 volts. The current provided for subscriber terminals 122 and 124 was 60 ± 5 milliamperes for a maximum loading capability of 3,000 ohms. The open circuit voltage across leads 120 was 26 ± 1.5 volts. The maximum operating voltage of the constant current source 113 was 210 volts. The input voltage across lead 114 under a no load condition was 300 volts.

What is claimed is:

1. A current splitter circuit for providing current to a first and a second load comprising:

a first pair of terminals for connection to a direct current source;

a second pair of terminals for connection to a first load circuit having a direct current path;

a third pair of terminals for connection to a second load circuit having a direct current path;

a direct current-to-alternating current converter circuit having an input circuit for passing direct current therethrough to energize said converter and an output circuit for providing an AC signal in response thereto;

first circuit means connecting said converter input circuit between said first and said second pair of terminals so that said input circuit is series connected through said first load circuit to the direct current source, and rectifier-filter circuit means connected between said converter output circuit and said third pair of terminals for applying a direct current to the second load having a magnitude that is a function of the direct current through said input circuit independent of the magnitude of the second load.

2. A current splitter circuit as defined in claim 1 including:

at least one detector circuit connected to one of said second and said third pair of terminals responsive to a resistance above a preset limit for the load exhibited across the pair of terminals connected thereto for applying a load across the terminals.

3. A current splitter circuit as defined in claim 2 wherein:

said detector circuit is responsive to an open circuit.

4. A current splitter circuit of claim 1 wherein:

the magnitude of the direct current flow through said first and second load and said inverter circuit is substantially equal.

5. In a telephone system including a central office for transmitting to and receiving from a plurality of subscriber stations frequency divided communications via a primary two-wire transmission line series interconnecting the subscriber stations by a direct current circuit and including a constant current source for applying direct current power to the subscriber terminals, a current splitter circuit for adding additional telephone circuits via a branch transmission line comprising:

a direct current-to-alternating current converter circuit having an input circuit for passing direct current therethrough to energize said converter and an output circuit for producing an AC signal in response thereto;

a two-to-four wire hybrid circuit having a two-wire input circuit connected to the primary transmission line on the office side and two two-wire output circuits, a first output circuit being connected to the primary transmission line on the station side and the second output circuit being connected to the branch transmission line, said hybrid circuit providing separate AC signal paths between each of the two-wire output circuits and the two-wire input circuit;

circuit means for connecting said converter input circuit between the two-wire input circuit and the first one of the two-wire output circuits to provide a series path for the flow of direct current from the constant current source to the station side of the transmission line, and rectifier-filter circuit means connected between the converter output circuit and the second one of the two-wire output circuits for applying a direct current to the branch transmission line, the magnitude of which is a function of the direct current flow through the converter input circuit independent of the load through which the branch transmission current flows.

6. A current splitter circuit as defined in claim 5 including:

detector circuit means connected to the first two-wire output circuit for connecting a DC load in parallel with the DC load of the primary transmission line on its station side when its resistance exceeds a preset value.

7. A current splitter circuit as defined in claim 6 wherein:

said detector circuit means is responsive to an open circuit condition across the first two-wire output circuit.

8. A current splitter circuit as defined in claim 5 including:

detector circuit means connected to the second two-wire output circuit for connecting a DC load in parallel with the DC load of the branch transmission line.

9. A current splitter circuit as defined in claim 8 wherein:

said detector circuit means is responsive to an open circuit across the second two-wire output circuit.

10. A current splitter circuit for energizing two loads from a direct current source comprising:

a DC to AC converter having an input circuit which is series connected through a first one of the two loads to the current source to be energized by the direct current passing therethrough and an output circuit through which an alternating current is developed and applied to any load connected thereacross which is proportional to the direct current through said input circuit independent of the load so connected, and a rectifier connected to said output circuit for rectifying the alternating current to direct current and applying the same to the second one of the two loads.

11. A current splitter circuit as defined in claim 10 including a detector circuit connected to at least one of the two loads for connecting a dummy load thereacross when the load resistance exceeds a preset value.

12. A current splitter circuit as defined in claim 11 whrein the preset value of load resistance is equivalent to an open circuit.

13. A current splitter circuit for interconnecting two branch telephone lines having terminal equipment connected thereto with a common telephone line which is energized from a direct current source comprising:

a hybrid circuit having two separate AC signal paths, each being connected between a different one of the two branch lines and the common line;

a DC to AC converter having an input circuit for energizing said converter which is connected between the common line and a first one of the two branch lines to provide a series direct current path from the current source to the first branch line and an output circuit through which an alternating current is developed and applied to any load connected thereto which is proportional to the direct current through said input circuit independent of the load so connected, and a rectifier connected to said output circuit for rectifying the alternating current to direct current and applying the same to the second one of the two branch lines.

14. A current splitter circuit as defined in claim 13 including a detector circuit connected to at least one of the two branch lines for connecting a dummy load in parallel with the DC load of the branch line when its resistance exceeds a preset value.

15. A current splitter circuit as defined in claim 14 wherein the preset value of load resistance is equivalent to an open circuit.

* * * * *